(12) United States Patent
Walker et al.

(10) Patent No.: US 9,868,625 B2
(45) Date of Patent: *Jan. 16, 2018

(54) SYSTEM OF ILLUMINATED TAP HANDLES

(71) Applicants: Andrew S. Walker, Fort Lauderdale, FL (US); James R. Lester, Lambton Shores (CA); Brian D. G. Maxfield, Camlachie (CA)

(72) Inventors: Andrew S. Walker, Fort Lauderdale, FL (US); James R. Lester, Lambton Shores (CA); Brian D. G. Maxfield, Camlachie (CA)

(73) Assignee: ILLUMITAP LLC, Boynton Beach, FL (US)

( * ) Notice: Subject to any disclaimer, the term of this patent is extended or adjusted under 35 U.S.C. 154(b) by 367 days.

This patent is subject to a terminal disclaimer.

(21) Appl. No.: 14/613,063

(22) Filed: Feb. 3, 2015

(65) Prior Publication Data

US 2015/0146412 A1 May 28, 2015

Related U.S. Application Data

(63) Continuation-in-part of application No. 13/856,010, filed on Apr. 3, 2013, which is a continuation-in-part of application No. 13/403,185, filed on Feb. 23, 2012, now Pat. No. 9,079,759, application No. 14/613,063, filed on Feb. 3, 2015, which is a continuation-in-part of application No. 13/403,185, filed on Feb. 23, 2012, now Pat. No. 9,079,759.

(60) Provisional application No. 61/585,471, filed on Jan. 11, 2012.

(51) Int. Cl.
  *B67D 1/08* (2006.01)
  *H02J 7/02* (2016.01)
  *F21S 9/02* (2006.01)
  *F21Y 115/10* (2016.01)

(52) U.S. Cl.
  CPC .............. *B67D 1/0874* (2013.01); *F21S 9/02* (2013.01); *H02J 7/025* (2013.01); *F21Y 2115/10* (2016.08)

(58) Field of Classification Search
  CPC ........ A46B 15/0036; A46B 2200/1066; A46B 15/0044; B60Q 3/0233; B67D 7/145; B67D 1/0874; F21S 9/02; H02J 7/025; F21Y 2101/00; F21Y 2115/10
  See application file for complete search history.

(56) References Cited

U.S. PATENT DOCUMENTS 9,079,759 B2 * 7/2015 Walker ................. B67D 1/0874

* cited by examiner

*Primary Examiner* — Stephen F Husar

(57) ABSTRACT

A system of illuminated tap handle includes at least one tap handle and a wireless power charging unit. A battery of the at least one tap handle is wirelessly charged through the wireless power charging unit in addition to a power supply port of the at least one tap handle. The at least one tap handle includes a gripping member and an illuminating member. The illuminating member attaches to the gripping member while the gripping member attaches with a beer tower opposite of the illuminating member so that the beer tower can be operated through the at least one tap handle. The illuminating member lights up within the at least one tap handle through at least one light-emitting diode light that is electrically connected with the battery.

18 Claims, 11 Drawing Sheets

SYSTEM OF ILLUMINATED TAP HANDLES

The current application is a continuation in part of U.S. Non-Provisional patent application Ser. No. 13/856,010 filed Apr. 3, 2013, now U.S. Pat. No. 9,567,202, which is a continuation in part of U.S. Non-Provisional patent application Ser. No. 13/403,185 filed Feb. 23, 2012, now U.S. Pat. No. 9,079,759, which claims benefit of U.S. Provisional Patent application Ser. No. 61/585,471 filed Jan. 11, 2012. Further, the current application is a continuation in part of U.S. Non-provisional patent application Ser. No. 13/403,185 filed Feb. 23, 2012 U.S. Pat. No. 9,079,759.

FIELD OF THE INVENTION

The present invention relates generally to a system of tap handles. More specifically, the system comprises at least one illuminated tap handle and a wireless power charging unit as the at least one illuminated tap handle communicably connects with the wireless power charging unit and a plurality of users.

BACKGROUND OF THE INVENTION

Beer tap handles have been used by a wide variety of organizations for centuries in order to dispense beer and other type of liquids. The beer tap handles have evolved into many different shapes and forms throughout the years as the beer tap handles are able to provide additional functionality in addition to dispensing beer. For example, different types of beer tap handles are often used to display different designs and decals for promotional purposes. Even though most of the beer handles are designed in regards to different promotional purposes, the displayed promotional messages are barely visible to the customers due to the low-lighting profiles of the respective establishments. In addition to the aforementioned usages, the beer tap handles have not been able to provide any other useful features to an establishment that uses the beer tap handles or the customers of the respective establishment.

It is therefore an object of the present invention to introduce a plurality of illuminated tap handle that can be powered through a wireless power charging unit. The present invention also allows the users to control the desired lighting effects of the plurality of illuminated tap handles, where the users of the present invention can be an authorized operator or the customers of an establishment. It is further objectives of the present invention to provide a wireless internet network and text messaging technology so that the customers of an establishment can join the wireless internet network to use the internet while the owners of the respective establishment are able to promote their business through the text messaging and communication technology.

DETAIL DESCRIPTIONS OF THE INVENTION

All illustrations of the drawings are for the purpose of describing selected versions of the present invention and are not intended to limit the scope of the present invention.

Figure 1:
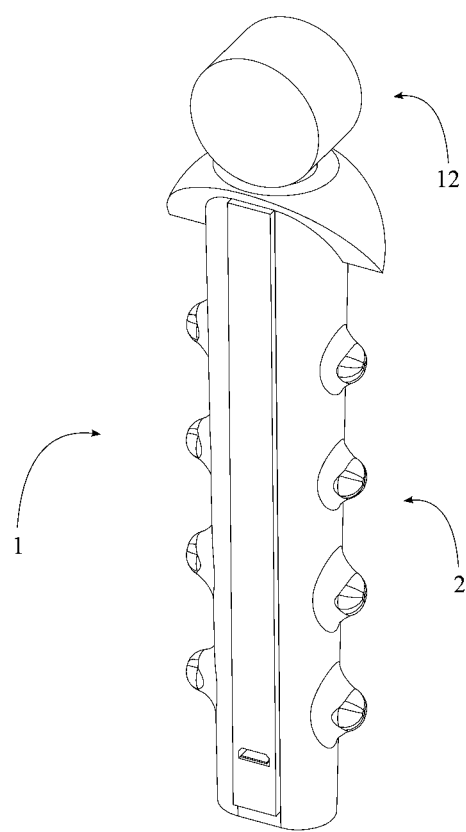
FIG. 1 is a perspective view of the tap handle of the present invention.
Figure 2:
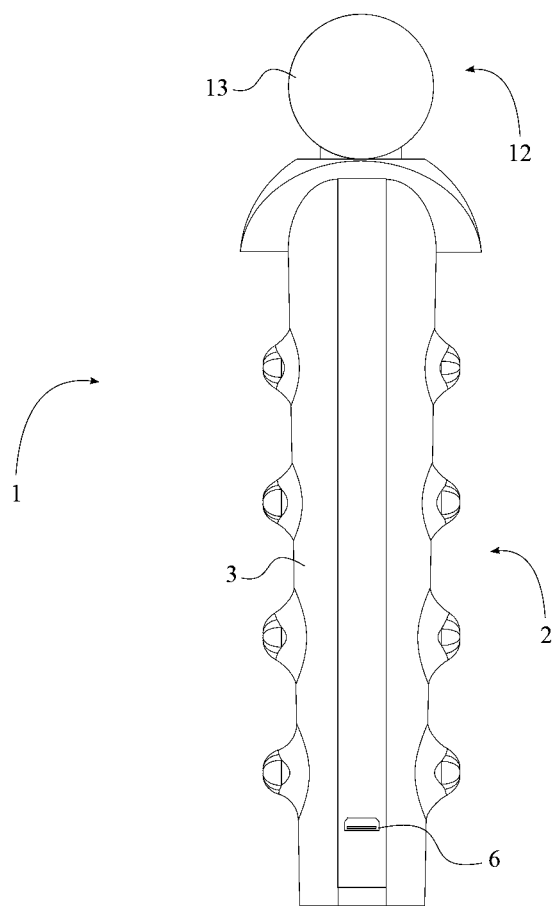
FIG. 2 is a side view of the tap handle of the present invention.

The present invention is a system for illuminated tap handles that comprises at least one tap handle 1 and a wireless power charging unit 16. The at least one tap handle 1 is used within restaurants and bars so that beer can be drafted from a pressurized container as the at least one tap handle 1 is attached with an existing beer tower. In reference to FIG. 1 and FIG. 2, the at least one tap handle 1 comprises a gripping member 2 that provides surface area to grab the at least one tap handle 1 during its usage and an illuminating member 12 that illuminates within the present invention. In order to complete the general configuration of the at least one tap handle 1, the illuminating member 12 is attached onto the gripping member 2. Additionally, a power receiver coil 9 of the gripping member 2 is communicably coupled with a power transmitting coil 17 of the wireless power charging unit 16 so that the electrical components within the at least one tap handle 1 can be wirelessly powered through the wireless power charging unit 16.

The gripping member 2 provides the necessary surface area for the at least one tap handle 1 so that the users can operate the beer tower to dispense beer. The gripping member 2 also functions as a housing for some of the internal components of the at least one tap handle 1. In reference to FIG. 3-FIG. 5, the gripping member 2 comprises an elongated body 3, a top connector 4, a handle attachment 5, a power supply port 6, a battery 7, a handle chipset 8, a power receiver coil 9, at least one light-emitting diode (LED) light 11, and a personal-area network module 10. The top connector 4 that accepts the illuminating member 12 and the handle attachment 5 are oppositely positioned from each other across the elongated body 3. The exterior surface of the elongated body 3 is ergonomically shaped so that the users are able to comfortably grip the at least one tap handle 1. The handle attachment 5 is designed to fit the at least one tap handle 1 with the current models of beer towers in use today. The handle attachment 5 preferably comprises a female threaded connection so that the at least one tap handle 1 can connect with the beer towers already installed in restaurants and bars in North America, since the existing beer towers generally comprise male threaded connections. According to the demand, the female threaded connection of the handle attachment 5 can be changed into a male threaded connection, if the existing beer towers comprise female threaded connections. The elongated body 3 is preferably made from stainless steel or plastic; however, the elongated body 3 can be made out of any other type of corrosion free and durable materials such as tempered glass, composite materials, and different alloy materials.

Figure 5:
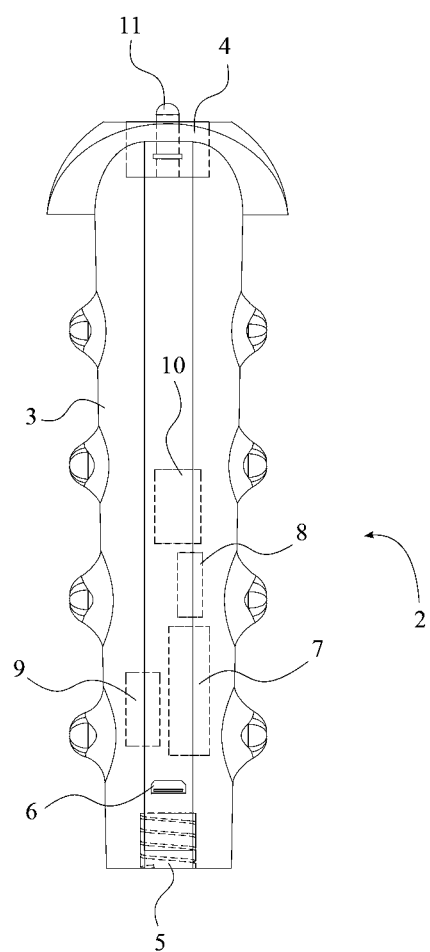
FIG. 5 is a side view of the gripping member of the tap handle, wherein the dash lines illustrate the internal components of the gripping member.
Figure 12:
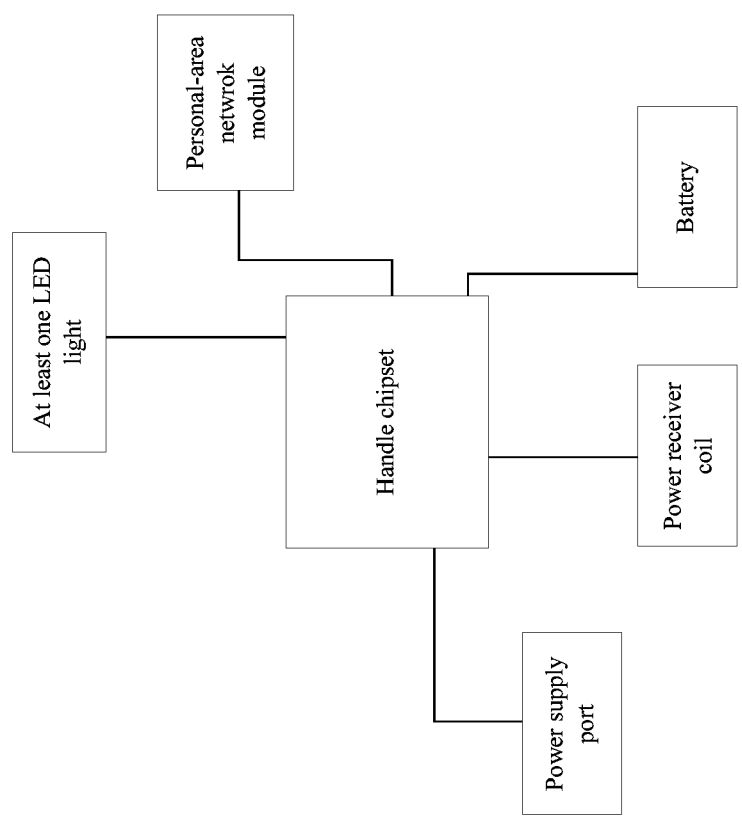
FIG. 12 is an illustration showing the basic electrical connections of the tap handle.

In reference to FIG. 5 and FIG. 12, the at least one LED light 11 that provides the lighting effects to the illuminating member 12 is concentrically mounted within the top connector 4. The at least one LED light 11 is electrically connected with the handle chipset 8 so that the handle chipset 8 is able to power and control the at least one LED light 11 within the at least one tap handle 1.

Figure 3:
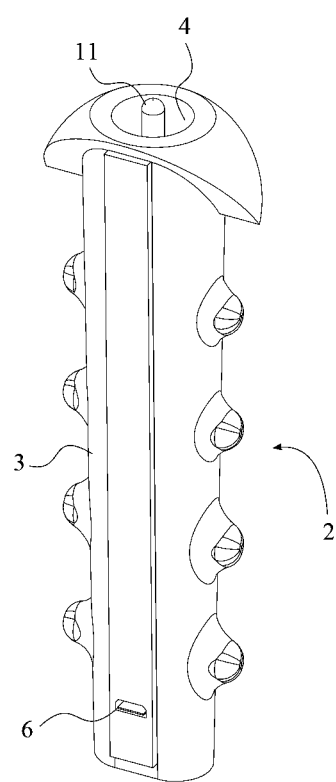
FIG. 3 is a top perspective view of the gripping member of the tap handle.
Figure 4:
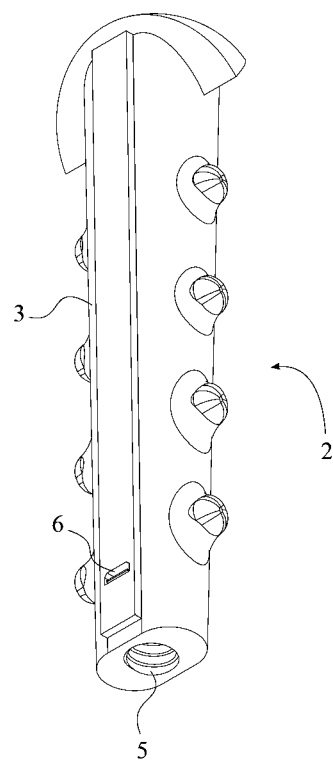
FIG. 4 is a bottom perspective view of the gripping member of the tap handle.

In reference to FIG. 3 and FIG. 5, the power supply port 6 is positioned on the elongated body 3 adjacent to the handle attachment 5, where the power supply port 6 enables the present invention to be powered through an external power source. In the preferred embodiment of the present invention, the power supply port 6 is a Universal Serial Bus (USB) port, where the USB port powers the at least one tap handle 1 through an extension cord. In reference to FIG. 12, the power supply port 6 is electrically connected with the handle chipset 8 so that the handle chipset 8 is able to power the personal-area network module 10 and charge the battery 7.

In reference to FIG. 5, the battery 7 is internally positioned within the elongated body 3 and positioned adjacent to the power supply port 6. More specifically, a lithium ion battery 7 is preferably used as the battery 7 of the at least one tap handle 1 which holds about eight to twelve hours of battery 7 life per cycle. The battery 7 is hermetically sealed inside the elongated body 3 in order to prevent any kind liquid damage that may occur during the usage of the at least one tap handle 1. Since the battery 7 is hermetically sealed, the battery 7 can stand up to the high demands and damages involved with a given working environment. The battery 7 is the only power source for the at least one LED and the personal-area network module 10 as the battery 7 is charged through the power supply port 6 and the wireless power charging unit 16. In reference to FIG. 12, the battery 7 is electrically connected with the handle chipset 8 so that the at least one LED light 11 and the personal-area network module 10 can be powered through the battery 7.

Figure 11:
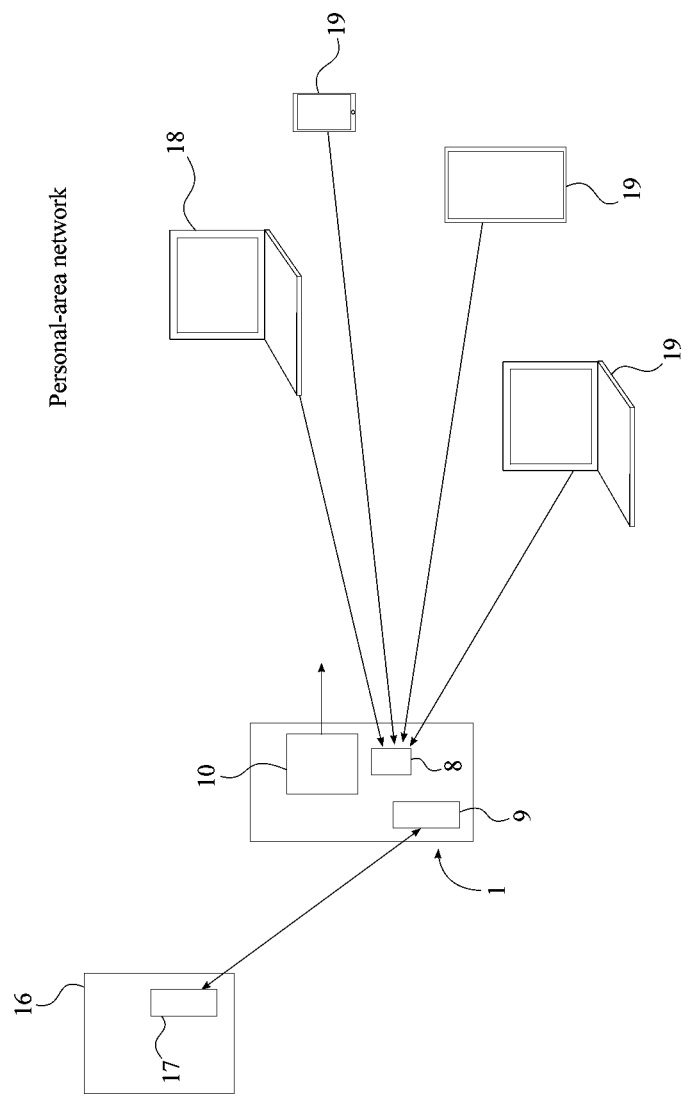
FIG. 11 is an illustration showing the basic communication connections of the present invention.

In reference to FIG. 5, FIG. 11, and FIG. 12, the power receiver coil 9, which is communicably coupled with the power transmitting coil 17 of the wireless power charging unit 16, is internally positioned within the elongated body 3 and positioned adjacent to the battery 7. The power receiver coil 9 is also electrically connected with the handle chipset 8 so that the electrical power transmitted from the power transmitting coil 17 can be utilized to charge the battery 7. More specifically, the wireless power charging unit 16 with the power transmitting coil 17 is adjacently positioned with the at least one tap handle 1. Then the power transmitting coil 17 is able to provide a trickle charge of power that charges the battery 7 within the elongated body 3, where the power transmitting coil 17 and the power receiver coil 9 jointly recharge the battery 7. As a result, the battery 7 consistently powers the at least one LED light 11 and the personal-area network module 10 within the at least one tap handle 1.

In reference to FIG. 5, FIG. 11, and FIG. 12, the personal-area network module 10 is internally positioned within the elongated body 3 and positioned adjacent to the battery 7, where the personal-area network module 10 is also electrically connected with the handle chipset 8. The personal-area network module 10 provides a personal-area network with a predetermined coverage area so that the at least one tap handle 1 is able to interact with the customers through a plurality of web enabled computing devices 19. In order for the at least one tap handle 1 to interact with customers, the at least one tap handle 1 is communicably coupled with the plurality of web enabled computing devices 19 through the personal-area network module 10 as the plurality of web enabled computing devices 19 can include, but not limited to, laptops, smartphones, and tablets. More specifically, once the plurality of web enabled computing devices 19 positions within the predetermined coverage area of the personal-area network, and the plurality of web enabled computing devices 19 is capable of operating within the personal-area network, the plurality of web enabled computing devices 19 is able to communicably coupled with the at least one tap handle 1 through the personal-area network module 10. Then the at least one tap handle 1 automatically sends the short text message with a website landing link to the plurality of web enabled computing devices 19 through the personal-area network, where the short text message with a website landing link optimizes direct marketing. The handle chipset 8 is able to process the short text message within the at least one tap handle 1 as the handle chipset 8 functions as the processor unit of the at least one tap handle 1. The handle chipset 8 is internally positioned within the elongated body 3 adjacent to the battery 7 so that the handle chipset 8 can be protected from the outside elements.

Since the battery 7, the power receiver coil 9, the handle chipset 8, and the personal-area network module 10 are sealed within the elongated body 3, the usual damages that can occur related to liquid contaminations and heavy use of the at least one tap handle 1 are completely eliminated from the present invention.

Figure 7:
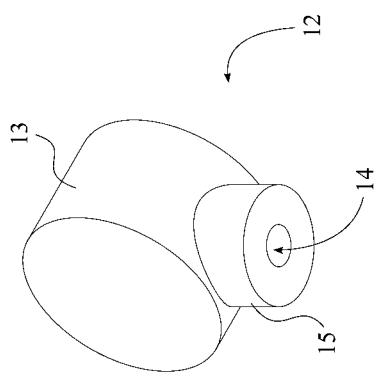
FIG. 7 is a bottom perspective view of the illuminating member of the tap handle.
Figure 6:
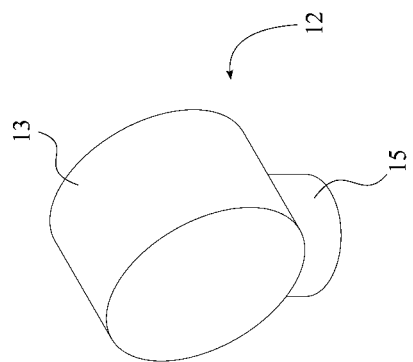
FIG. 6 is a top perspective view of the illuminating member of the tap handle.
Figure 8:
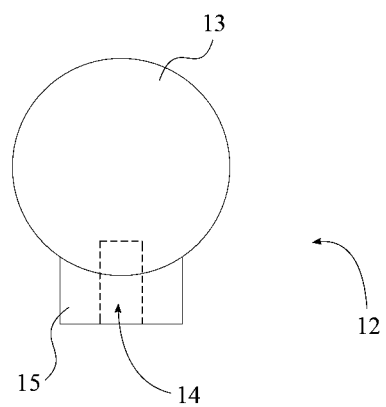
FIG. 8 is a side view of the illuminating member of the tap handle, wherein the dash lines illustrate the cavity of the illuminating member.

In reference to FIG. 6-FIG. 8, the illuminating member 12 comprises a transparent body 13, a cavity 14, and a bottom connector 15 so that the at least one LED light 11 can be positioned within the illuminating member 12 while the illuminating member 12 attaches with the gripping member 2. More specifically, the transparent body 13 is hermetically connected with the bottom connector 15 while the cavity 14 is traversed into transparent body 13 through the bottom connector 15. The cavity 14 is also concentrically positioned with the bottom connector 15 so that the cavity 14 is able to align with the at least one LED light 11. The illuminating member 12 is preferably made from synthetic resin materials so that the transparent body 13 can be formed through laser etching technology and can be painted with desired colors. Additionally, the laser etching technology creates fine detailed transparent body 13 and allows the light to effectively shine through the transparent body 13. Even though the illuminating member 12 is preferably made from synthetic resin materials, the illuminating member 12 can also be made from stronger and more durable materials such as clear plastic, tempered glass, and composite materials. The transparent body 13 can be made into different decals and different shapes so that the transparent body 13 is able to relate with different beer companies, different branding requirements, different logos, and different marketing embodiment such as sports team logos.

Figure 9:
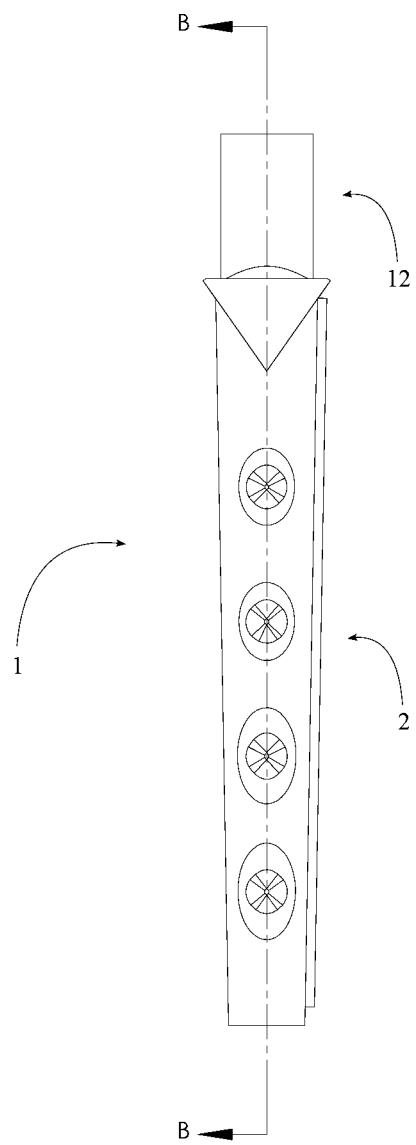
FIG. 9 is a side view of the tap handle of the present invention, showing the plane upon which a cross section view is taken shown in FIG. 10.
Figure 10:
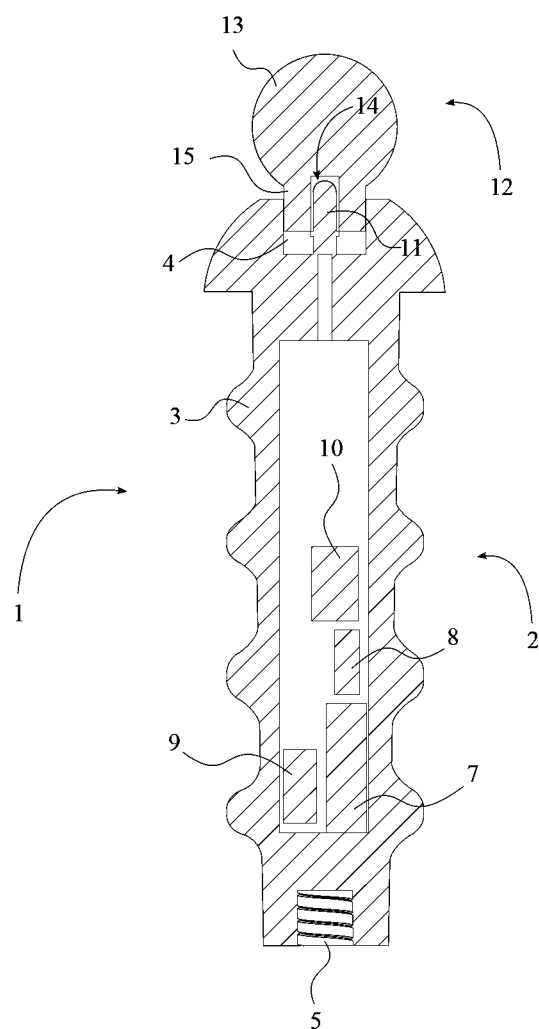
FIG. 10 is a cross section view of the tap handle of the present invention taken along line B-B of FIG. 9.

In reference to FIG. 9 and FIG. 10, the attachment between the illuminating member 12 and the gripping member 2 is accomplished through the bottom connector 15 and the top connector 4 within the at least one tap handle 1. More specifically, the bottom connector 15 is concentrically attached with the top connector 4 through an attachment method, wherein the attachment method can be a snap-fit attachment method or a friction attachment method. Then the at least one LED light 11 is able to traverse into the illuminating member 12 through the cavity 14 so that the at least one LED light 11 can light up the illuminating member 12.

Since the at least one LED light 11 is oppositely positioned from the handle attachment 5, the at least one LED light 11 is easily protected from any kind of liquid contamination that may occur around the handle attachment 5. The at least one LED light 11 can be either red, green, blue, or white LED light as the mentioned four different colors allow the users of the present invention to have the complete control over the color spectrum. For example, if the transparent body 13 is painted, the at least one LED light 11 illuminates in white color so that the painted transparent body 13 can be clearly displayed with the designated colors. If the users of the present invention decide to simply use one specific color to illuminate the illuminating member 12, the users are able to select that one specific color through a remote control device or a remote computing device 18 that is communicably coupled with the handle chipset 8. Having the ability to change the color scheme with the present invention is a unique improvement so that the at least one tap handle 1 can be used with personalized events which comprise specific color themes and holidays associated with specific colors. For example, the illuminating member 12 can be illuminated with red color around the Valentine's Day, providing an aesthetically pleasing surrounding area for an establishment.

The remote control device allows the users to have complete control over desired lighting effects within the at least one tap handle 1 as the at least one LED light 11 is remotely controlled by the remote control device through the handle chipset 8. The users, such as bartenders, owners, and managers, are given complete control over the lighting of the at least one tap handle 1 through the remote control device. The remote control device may comprise a plurality of control buttons which controls all of the functions related to the color spectrum of the at least one LED light 11. Each button for the plurality of control buttons is given a specific functionality to simplify the process. For example, the plurality of control buttons allows the users to adjust the illumination (dim or brighten), control fade effects between colors, flash the colors for added lighting effect, transition between set colors, and turn the handle on or off to preserve the battery 7 life. It is also possible to operate the at least one tap handle 1 without the remote control device; this adaptation would limit the effectiveness of the color spectrum as the at least one LED light 11 may operate by a control panel of the at least one tap handle 1.

In reference to FIG. 11, the at least one LED light 11 can also be controlled by a remote computing device 18, where the remote computing device 18 is controlled by an authorized user. When the remote computing device 18 is communicably coupled with the at least one tap handle 1 through a software application or the personal-area network of the personal-area network module 10, the remote computing device 18 is able to control the at least one LED light 11 and able to edit the short text message with a website landing link as the authorized user desired. For example, the short text message with a website landing link can be a business promotional message with a hyperlink to the establishment website, a daily special message with a hyperlink to the establishment menu, and a coupon message with a hyperlink to online coupons. Then the authorized user is able to choose the correct type of short text message depending upon the respective promotion.

In reference to FIG. 11, the plurality of web enabled computing devices 19 of the present invention is also able to remotely control the at least one LED light 11 through the handle chipset 8. In order to accomplish remote operation of the at least one LED light 11 by the plurality of web enabled computing devices 19, the plurality of web enabled computing devices 19 needs to download a specific mobile application which correlates with the at least one LED light 11 and functions same as the remote control device. Once the specific mobile application is downloaded to the plurality of web enabled computing devices 19, each of the plurality of web enabled computing devices 19 can control the at least one LED light 11 for a predetermined time period.

Since the battery 7 is charged through the power supply port 6 and the wireless power charging unit 16, the at least one tap handle 1 is constantly powered with the electrical current for the optimal functionality. More specifically, the battery 7 can be constantly charged through the power supply port 6 as long as the extension cord is plugged into the power supply port 6 and the external power source, where the power supply port 6 provides a direct charging system. However, the battery 7 is also indirectly charged through the wireless power charging unit 16, where the wireless power charging unit 16 is completely isolated the at least one tap handle 1.

The present invention can also comprise a wireless local area network module that can be positioned within the griping member or can be positioned as a separate unit from the at least one tap handle 1. The wireless local area network module is hardwired with an internet providing source through a Wide Area Network (WAN) port. Then the wireless local area network module is able to provide a wireless network with a predetermined coverage area. As a result, the plurality of web enabled computing devices 19 can also access internet through the wireless network as a hotspot, if the plurality of web enabled computing devices 19 is positioned within the predetermined coverage area of the wireless network, and the plurality of web enabled computing devices 19 is capable of operating within the wireless network.

Although the invention has been explained in relation to its preferred embodiment, it is to be understood that many other possible modifications and variations can be made without departing from the spirit and scope of the invention as hereinafter claimed.

What is claimed is:

1. A system of illuminated tap handles comprises:
   at least one tap handle;
   a wireless power charging unit;
   the at least one tap handle comprises a gripping member and an illuminating member;
   the gripping member comprises a power supply port, a battery, a handle chipset, a power receiver coil, at least one light-emitting diode (LED) light, and a personal-area network module;
   the illuminating member being attached onto the gripping member; and
   the power receiver coil of the gripping member being communicably coupled with a power transmitting coil of the wireless power charging unit.

2. The system of illuminated tap handles as claimed in claim 1 comprises:
   the gripping member further comprises an elongated body, a top connector, and a handle attachment;
   the top connector being and the handle attachment being oppositely positioned from each other across the elongated body;

the at least one LED light being concentrically mounted within the top connector;

the power supply port being positioned on the elongated body adjacent to the handle attachment;

the battery being internally positioned within the elongated body adjacent to the power supply port;

the power receiver coil being internally positioned within the elongated body adjacent to the battery;

the handle chipset being internally positioned within the elongated body in between the top connector and the handle attachment; and the personal-area network module being internally positioned within the elongated body adjacent to the battery.

3. The system of illuminated tap handles as claimed in claim 1, wherein the at least one LED light, the power supply port, the battery, the power receiver coil, the personal-area network module being electrically connected with the handle chipset.

4. The system of illuminated tap handles as claimed in claim 1, wherein the at least one tap handle being communicably coupled with a plurality of web enabled computing devices through the personal-area network module.

5. The system of illuminated tap handles as claimed in claim 1 comprises:

the illuminating member comprises a transparent body, a cavity, and a bottom connector;

the transparent body being hermetically connected with the bottom connector;

the cavity traversing into the transparent body through bottom connector; and the cavity being concentrically positioned with the bottom connector.

6. The system of illuminated tap handles as claimed in claim 1 comprises:

a bottom connector of the illuminating member being concentrically attached with a top connector of the gripping member; and the at least one LED light traversing into a cavity of the illuminating member.

7. The system of illuminated tap handles as claimed in claim 1, wherein the at least one LED light being remotely controlled by a plurality of web enabled computing devices through the handle chipset.

8. The system for illuminated tap handles as claimed in claim 1, wherein the at least one LED light being remotely controlled by a remote computing device through the handle chipset.

9. The system for illuminated tap handles as claimed in claim 1 comprises:

the wireless power charging unit being adjacently positioned with the at least one tap handle, wherein the power transmitting coil and the power receiver coil jointly recharge the battery.

10. A system of illuminated tap handles comprises:
at least one tap handle;
a wireless power charging unit;
the at least one tap handle comprises a gripping member and an illuminating member;
the gripping member comprises an elongated body, a top connector, a handle attachment, a power supply port, a battery, a handle chipset, a power receiver coil, at least one light-emitting diode (LED) light, and a personal-area network module;

the top connector being and the handle attachment being oppositely positioned from each other across the elongated body;

the at least one LED light being concentrically mounted within the top connector;

the illuminating member being attached onto the top connector; and the power receiver coil of the gripping member being communicably coupled with a power transmitting coil of the wireless power charging unit.

11. The system of illuminated tap handles as claimed in claim 10 comprises:

the power supply port being positioned on the elongated body adjacent to the handle attachment;

the battery being internally positioned within the elongated body adjacent to the power supply port;

the power receiver coil being internally positioned within the elongated body adjacent to the battery;

the handle chipset being internally positioned within the elongated body in between the top connector and the handle attachment; and the personal-area network module being internally positioned within the elongated body adjacent to the battery.

12. The system of illuminated tap handles as claimed in claim 10, wherein the at least one LED light, the power supply port, the battery, the power receiver coil, the personal-area network module being electrically connected with the handle chipset.

13. The system of illuminated tap handles as claimed in claim 10, wherein the at least one tap handle being communicably coupled with a plurality of web enabled computing devices through the personal-area network module.

14. The system of illuminated tap handles as claimed in claim 10 comprises:

the illuminating member comprises a transparent body, a cavity, and a bottom connector;

the transparent body being hermetically connected with the bottom connector;

the cavity traversing into the transparent body through bottom connector; and the cavity being concentrically positioned with the bottom connector.

15. The system of illuminated tap handles as claimed in claim 10 comprises:

a bottom connector of the illuminating member being concentrically attached with the top connector; and the at least one LED light traversing into a cavity of the illuminating member.

16. The system of illuminated tap handles as claimed in claim 10, wherein the at least one LED light being remotely controlled by a plurality of web enabled computing devices through the handle chipset.

17. The system for illuminated tap handles as claimed in claim 10, wherein the at least one LED light being remotely controlled by a remote computing device through the handle chipset.

18. The system for illuminated tap handles as claimed in claim 10 comprises:

the wireless power charging unit being adjacently positioned with the at least one tap handle, wherein the power transmitting coil and the power receiver coil jointly recharge the battery.

* * * * *